US012401760B2

(12) United States Patent
Jindal et al.

(10) Patent No.: US 12,401,760 B2
(45) Date of Patent: Aug. 26, 2025

(54) TIMELAPSE VIDEO GENERATION

(71) Applicant: ADOBE INC., San Jose, CA (US)

(72) Inventors: Nipun Jindal, Delhi (IN); Tanya Jindal, Delhi (IN); Pramendra Rathi, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 71 days.

(21) Appl. No.: 18/470,749

(22) Filed: Sep. 20, 2023

(65) Prior Publication Data

US 2025/0097380 A1    Mar. 20, 2025

(51) Int. Cl.
*H04N 7/01*    (2006.01)
*G06T 11/20*   (2006.01)

(52) U.S. Cl.
CPC ......... *H04N 7/0122* (2013.01); *G06T 11/203* (2013.01)

(58) Field of Classification Search
CPC .............................. H04N 7/0122; G06T 11/203
See application file for complete search history.

(56) References Cited

U.S. PATENT DOCUMENTS

| 10,986,308 | B2 | 4/2021 | Huynh et al. |
| 11,490,048 | B2 | 11/2022 | Huynh et al. |
| 2011/0033130 | A1* | 2/2011 | Poon ...................... H04N 19/85 |
| | | | 375/E7.076 |
| 2017/0221253 | A1* | 8/2017 | Banerjee ................ G06T 11/001 |
| 2023/0035671 | A1* | 2/2023 | Wu ....................... G06N 3/0464 |

* cited by examiner

*Primary Examiner* — Yassin Alata
(74) *Attorney, Agent, or Firm* — F. CHAU & ASSOCIATES, LLC

(57) ABSTRACT

Embodiments of the present disclosure include obtaining an input video depicting a change to an image, wherein the input video has a first aspect ratio. Some embodiments compute a cost function for a frame of the input video based on a location of the change. A modified frame corresponding to the frame of the input video is generated based on the cost function. In some examples, the modified frame has a second aspect ratio different from the first aspect ratio. Then, an output video including the modified frame is generated and the output video has the second aspect ratio.

20 Claims, 12 Drawing Sheets

[w,h] Canvas Capture

[w,h] Canvas Capture

TIMELAPSE VIDEO GENERATION

BACKGROUND

The following relates generally to video processing, more specifically to timelapse video generation. Video processing refers to the use of a computer to edit a set of frames or analyze a video file using an algorithm or a processing network. In some examples, a video editing model takes an input video and an editing command and generates an edited video based on the editing command. In some cases, videos may be generated or modified for use on social media platforms.

SUMMARY

The present disclosure describes systems and methods for video processing. Embodiments of the present disclosure include a video processing apparatus configured to obtain an input video having a first aspect ratio (e.g., a timelapse video) and generate an output video. The video processing apparatus receives metadata such as user strokes and salient information for subsequent optimization. The user strokes data and frame data derived from a user's interaction with a canvas using a drawing application are tracked per timestamp. The video processing apparatus, via an optimization model, computes a cost function based on user stroke information and preserves essential information in the input video such as stroke related actions based on the cost function. The video processing apparatus generates a modified output video having a second aspect ratio that is different from the first aspect ratio.

A method, apparatus, and non-transitory computer readable medium for video processing are described. One or more embodiments of the method, apparatus, and non-transitory computer readable medium include obtaining an input video depicting a change to an image, wherein the input video has a first aspect ratio; computing a cost function for a frame of the input video based on a location of the change; generating a modified frame corresponding to the frame of the input video based on the cost function, wherein the modified frame has a second aspect ratio different from the first aspect ratio; and generating an output video including the modified frame, wherein the output video has the second aspect ratio.

An apparatus and method for video processing are described. One or more embodiments of the apparatus and method include at least one processor; at least one memory including instructions executable by the at least one processor; an optimization model comprising parameters stored in the at least one memory and configured to compute a cost function for a frame of an input video based on a location of a change, wherein the input video has a first aspect ratio; a frame editing component comprising parameters stored in the at least one memory and configured to generate a modified frame corresponding to the frame of the input video based on the cost function, wherein the modified frame has a second aspect ratio different from the first aspect ratio; and a video generation component comprising parameters stored in the at least one memory and configured to generate an output video including the modified frame, wherein the output video has the second aspect ratio.

DETAILED DESCRIPTION

Figure 1:
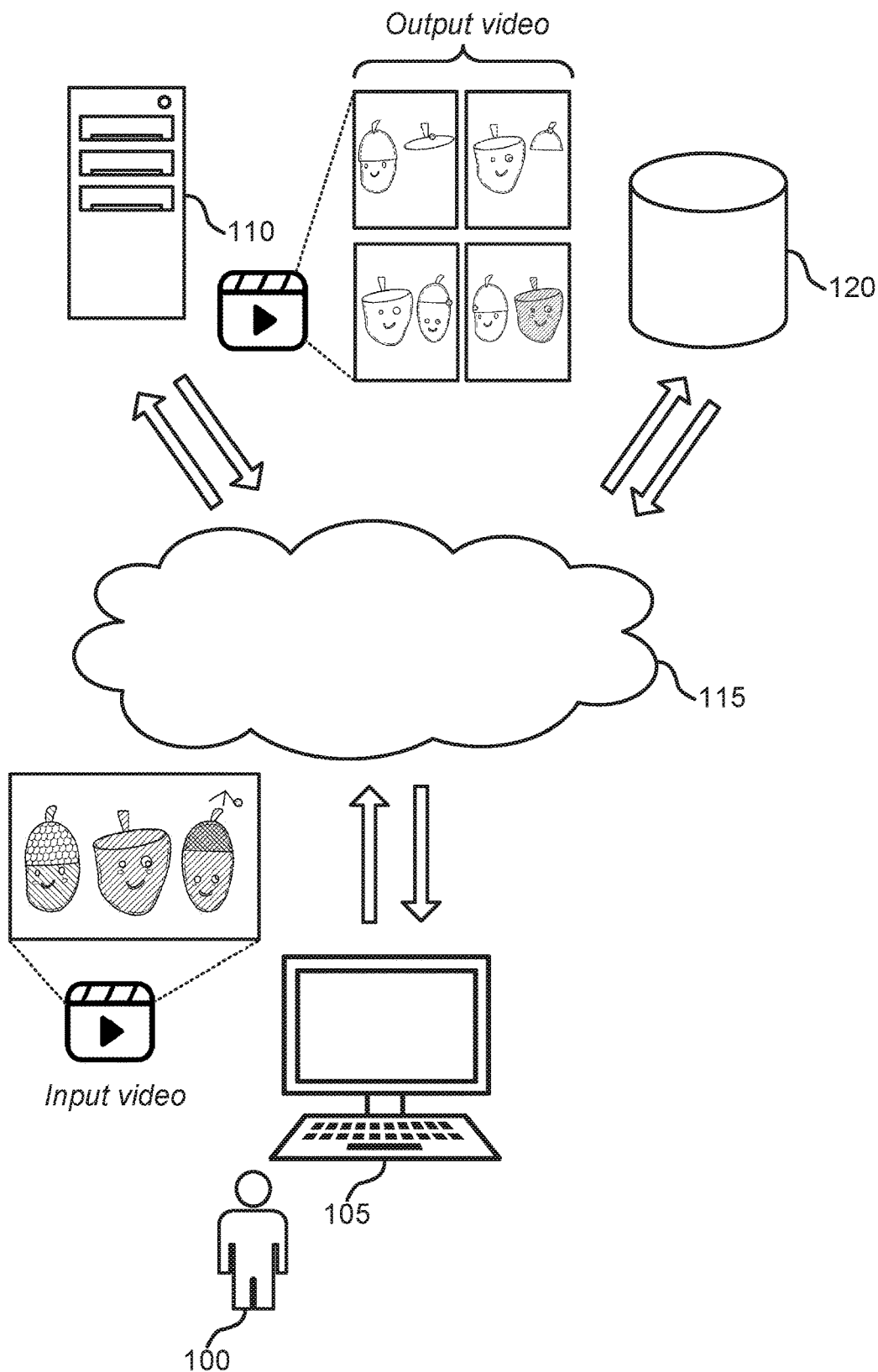
FIG. 1 shows an example of a video processing system according to aspects of the present disclosure.

The present disclosure describes systems and methods for video processing.

Embodiments of the present disclosure include a video processing apparatus configured to obtain an input video having a first aspect ratio (e.g., a timelapse video) and generate an output video. The video processing apparatus receives metadata such as user strokes and salient information for subsequent optimization. The user strokes data and frame data derived from a user's interaction with a canvas using a drawing application are tracked per timestamp. The video processing apparatus, via an optimization model, computes a cost function based on user stroke information and preserves essential information in the input video such as stroke related actions based on the cost function. The video processing apparatus generates a modified output video having a second aspect ratio that is different from the first aspect ratio.

Videos are often resized or cropped to enable uploading on social media platforms. An aspect ratio of an original video is modified to a different aspect ratio to comply with platform rules. Conventional editing tools crop the frames of a video to just fit into the aspect ratio, but these tools fail to take user strokes data or the actual focus points into account. For example, conventional methods are limited to applying a fixed cropping window across the frames in a video (e.g., center-based reframing on the video). In some cases, to keep up with frame-by-frame editing of a timelapse video, content creators spend a lot of time on editing to shift things into view that could have been spent on creating content. Accordingly, user experience (i.e., the experience of the content creators and audience viewing the cropped video is low) and content quality are decreased.

Embodiments of the present disclosure include a video processing apparatus configured to convert an input video having a first aspect ratio to an output video having a second aspect ratio based on user strokes information. The input video depicts a change to an image (e.g., a user working on a digital canvas using a drawing, sketching or painting application). An optimization model of the video processing apparatus computes a cost function for a frame of the input video based on a location of the change. The video processing apparatus generates a modified frame corresponding to the frame of the input video based on the cost function. The modified frame has a second aspect ratio different from the first aspect ratio. The output video includes the modified frame and has the second aspect ratio.

In some embodiments, the video processing apparatus captures user strokes data at each timestamp and then utilizes these data to form an optimization task by enabling a cost function (e.g., L2 cost) tracked per frame. The video processing apparatus generates a re-targeted video that maximizes showing the user's interface with the drawing application. The video processing apparatus also regularizes the output video to be smooth and natural for viewing.

In some embodiments, the video processing apparatus extracts salient information data at each timestamp from the captured frame and adds the salient information data into the tracked cost function, to identify and highlight other salient features in the video rather than empty spaces. In some cases, the video processing apparatus is configured to prioritize tracking actual user interaction with the drawing application (e.g., actual strokes or brushes on the canvas) and then the other salient drawing in the frame.

In some examples, the cost function is formulated to penalize the cost of moving the window every frame and impose higher penalty for cuts from one frame to another. This cost is again tracked across the length of the video. Embodiments of the present disclosure may be used in the context of video generation applications. For example, a video processing tool based on the present disclosure takes a timelapse video and efficiently generates an output video that has a different aspect ratio than that of the timelapse video while the output video is based on user strokes information and preserves focus points of the drawing to increase viewing quality.

Embodiments of the present disclosure can be used in the context of video generation applications. For example, a video processing apparatus based on the present disclosure receives an original video or a drawing session initiated on a drawing application, and generates modified timelapse that has a target aspect ratio while preserving and following user stroke inputs. An example application in the image generation context is provided with reference to FIGS. 2-4. Details regarding the architecture of an example video processing system are provided with reference to FIGS. 1 and 6-7. Details regarding the process of video processing and timelapse video generation are provided with reference to FIGS. 5 and 8-11.

As such, embodiments greatly improve the timelapse video generation and visualization process, such that the output timelapse video stays focused on user's actual stroke points (e.g., brush movements). For example, when a user worked on a right-hand portion of the canvas, one or more frames in the output timelapse video re-target the right-hand portion (i.e., the right-hand portion is to be shown in a center position of the one or more frames). Unlike prior techniques, the timelapse video creation process is performed using a optimization model, without manual editing by the user. Additionally, whereas prior techniques lead to frames that audience loses sight of actual stroke movements, embodiments keep user draw points in the center position. This intelligent timelapse video generation reduces the amount of resources required to complete a cropping or reframing project as well as enables the user to create a more appealing video that depicts key information in a drawing session.

Timelapse Video Processing

In FIGS. 1-5, a method, apparatus, and non-transitory computer readable medium for video processing are described. One or more embodiments of the method, apparatus, and non-transitory computer readable medium include obtaining an input video depicting a change to an image, wherein the input video has a first aspect ratio; computing a cost function for a frame of the input video based on a location of the change; generating a modified frame corresponding to the frame of the input video based on the cost function, wherein the modified frame has a second aspect ratio different from the first aspect ratio; and generating an output video including the modified frame, wherein the output video has the second aspect ratio.

Some examples of the method, apparatus, and non-transitory computer readable medium further include obtaining metadata for the input video including the location. Some examples of the method, apparatus, and non-transitory computer readable medium further include initiating, via an image editing interface, a drawing session. Some examples further include receiving a plurality of stroke inputs from a user, wherein the metadata includes location information for each of the plurality of stroke inputs.

Some examples of the method, apparatus, and non-transitory computer readable medium further include assigning a timestamp to each of the plurality of stroke inputs, wherein the metadata includes the timestamp.

In some examples, the metadata comprises a velocity parameter, a pressure parameter, an altitude parameter, an azimuth parameter, or a combination thereof, for at least one of the plurality of stroke inputs. In some examples, the change comprises an asset import or an asset deletion.

Some examples of the method, apparatus, and non-transitory computer readable medium further include obtaining saliency information for the modified frame, wherein the cost function is based on the saliency information.

Some examples of the method, apparatus, and non-transitory computer readable medium further include computing a transition cost for the modified frame based on a previous frame, wherein the cost function is based on the transition cost.

Some examples of the method, apparatus, and non-transitory computer readable medium further include computing a regularization term for the frame of the input video based on the cost function, wherein the modified frame is generated based on the regularization term.

FIG. 1 shows an example of a video processing system according to aspects of the present disclosure. The example shown includes user 100, user device 105, video processing apparatus 110, cloud 115, and database 120. Video processing apparatus 110 is an example of, or includes aspects of, the corresponding element described with reference to FIGS. 4 and 6.

In an example shown in FIG. 1, an input video (e.g., a timelapse video) is provided by user 100 and transmitted to video processing apparatus 110, e.g., via user device 105 and cloud 115. In some cases, user 100 initiates, via an image editing interface, a drawing session. User 100 draws multiple boy figures on a canvas within the drawing session. The set of boy figures includes cartoon-style faces. The input video includes a sequence of frames comprising a set of stroke inputs from user 100. The metadata includes location information for each of the set of stroke inputs. The input video has a first aspect ratio.

Video processing apparatus 110 computes a cost function for a frame of the input video based on a location of a change to a frame from the input video. Video processing apparatus 110 generates a modified frame corresponding to the frame of the input video based on the cost function. The modified frame has a second aspect ratio different from the first aspect ratio. Video processing apparatus 110 generates an output video including the modified frame and the output video has the second aspect ratio. Video processing apparatus 110 returns the output video (e.g., a modified timelapse video) to user 100 via cloud 115 and user device 105. The process of using video processing apparatus 110 is further described with reference to FIG. 2.

User device 105 may be a personal computer, laptop computer, mainframe computer, palmtop computer, personal assistant, mobile device, or any other suitable processing apparatus. In some examples, user device 105 includes software that incorporates an image editing application (e.g., a sketching and drawing application). In some examples, the image editing application on user device 105 may include functions of video processing apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Video processing apparatus 110 includes a computer implemented network comprising an image editing interface, a metadata component, an optimization model, a frame editing component, and a video generation component. In some examples, video processing apparatus 110 may also include a processor unit, a memory unit, and an I/O module. Additionally, video processing apparatus 110 can communicate with database 120 via cloud 115. In some cases, the architecture of the video processing network is also referred to as a network, a video processing model, or a network model. Further detail regarding the architecture of video processing apparatus 110 is provided with reference to FIGS. 6-7. Further detail regarding the operation of video processing apparatus 110 is provided with reference to FIGS. 2, 5 and 8.

In some cases, video processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
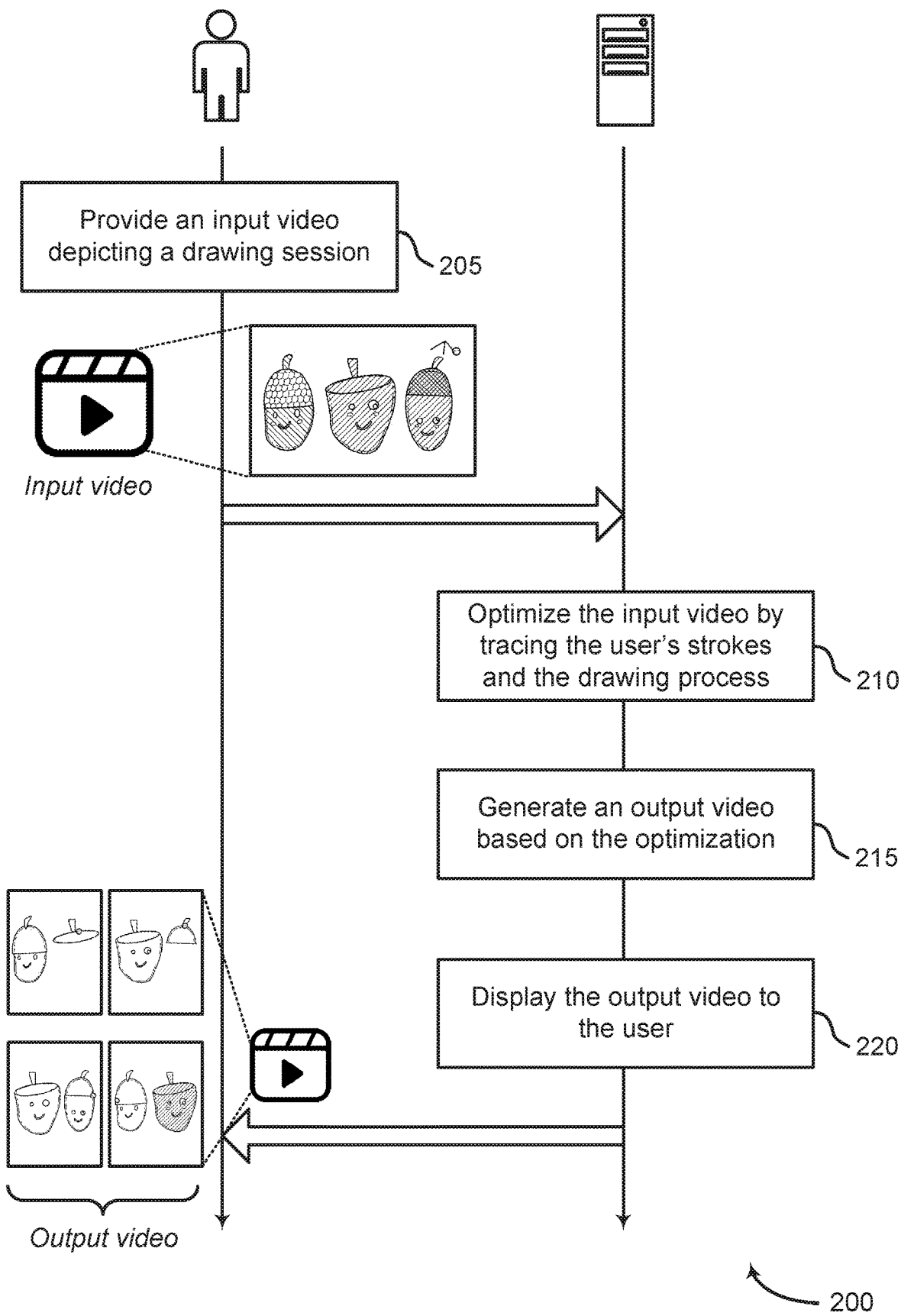
FIG. 2 shows an example of a method for video editing application according to aspects of the present disclosure.

FIG. 2 shows an example of a method 200 for a video editing application according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, a user provides an input video depicting a drawing session, where the input video has a first aspect radio. In some cases, the operations of this step refer to, or may be performed by, a user as described with reference to FIG. 1. In some examples, the user opens a drawing session using a sketching and drawing application (e.g., Fresco). An input video is generated that traces user interaction with the drawing application (e.g., brush movements on a canvas, stroke inputs on the canvas, etc.). The input video may also be referred to as a timelapse video.

At operation 210, the system optimizes the input video by tracing the user's strokes and the drawing process. In some cases, the operations of this step refer to, or may be performed by, a video processing apparatus as described with reference to FIGS. 1, 4, and 6. In some examples, the video processing apparatus based on the present disclosure identifies the user's strokes and actual focus points of the drawing. The video processing apparatus incorporates user strokes data and frame data per timestamp while the user is engaged in drawing on the drawing application.

At operation 215, the system generates an output video based on the optimization, where the output video has a second aspect ratio that is different from the first aspect radio. In some cases, the operations of this step refer to, or may be performed by, a video processing apparatus as described with reference to FIGS. 1, 4, and 6. The output video is a refined video compared to the input video. In some examples, the output video preserves important parts in the input video and removes insignificant parts in the input video based in part on user strokes data.

At operation 220, the system displays the output video to the user. In some cases, the operations of this step refer to, or may be performed by, a video processing apparatus as described with reference to FIGS. 1, 4, and 6. The output video is uploaded to one or more social media platforms. The second aspect ratio complies with target dimensions of the one or more social media platforms. In some cases, the user continues to edit the output video using a video editing tool.

Figure 3:
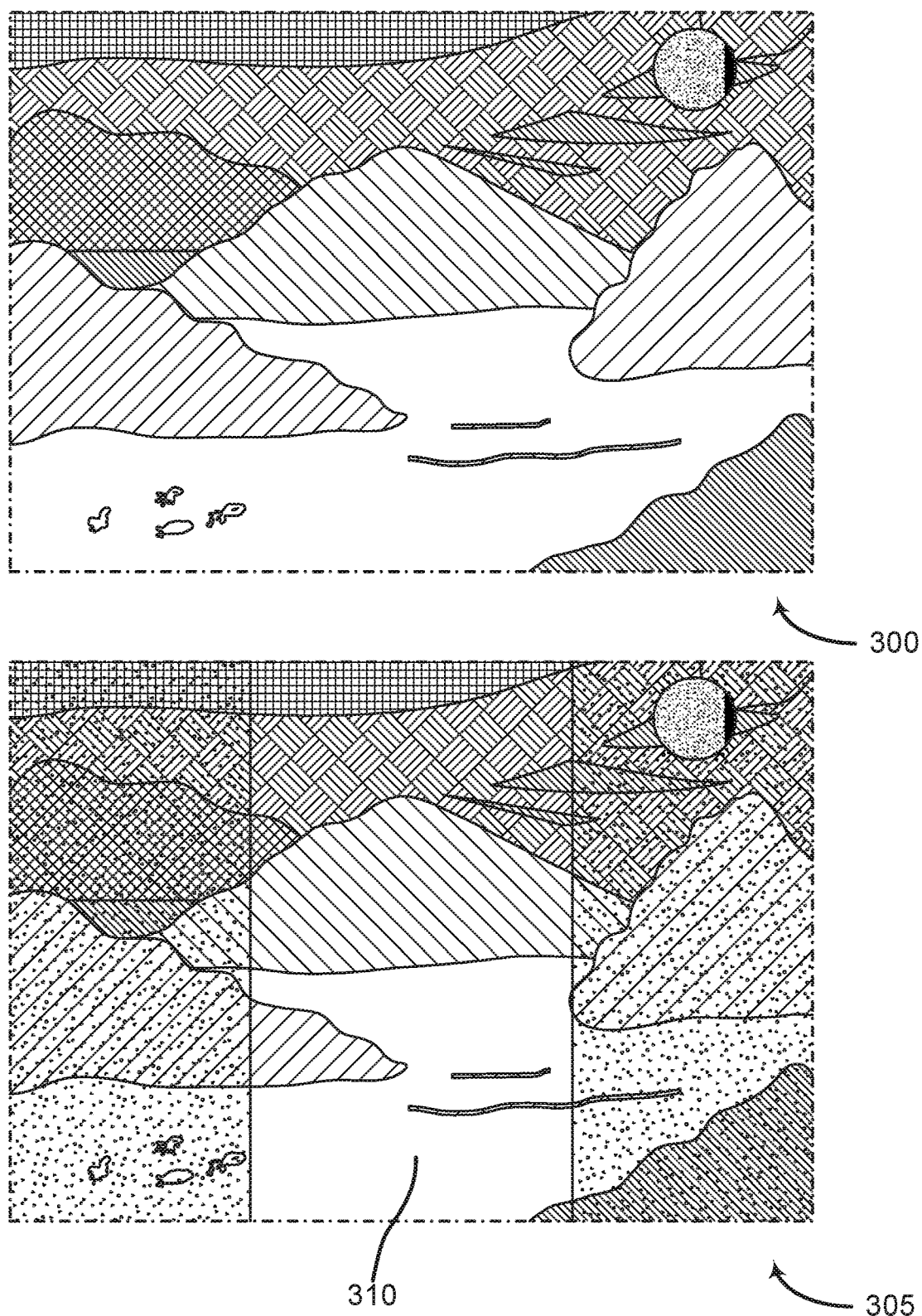
FIG. 3 shows an example of center-based cropping according to aspects of the present disclosure.

FIG. 3 shows an example of center-based cropping according to aspects of the present disclosure. The example shown includes original frame 300, modified frame 305, and center portion 310. In an example shown in FIG. 3, original frame 300 depicts landscape including mountains and lakes. Original frame 300 is one frame from an input video comprising a set of frames. In an embodiment, a video editing tool resizes the input video or changes the aspect ratio of original frame 300 to fit video templates of a social media platform. The video editing tool crops out center portion 310 of original frame 300 based on target dimensions to obtain modified frame 305. Original frame 300 is an example of, or includes aspects of, the corresponding element described with reference to FIG. 4.

Figure 4:
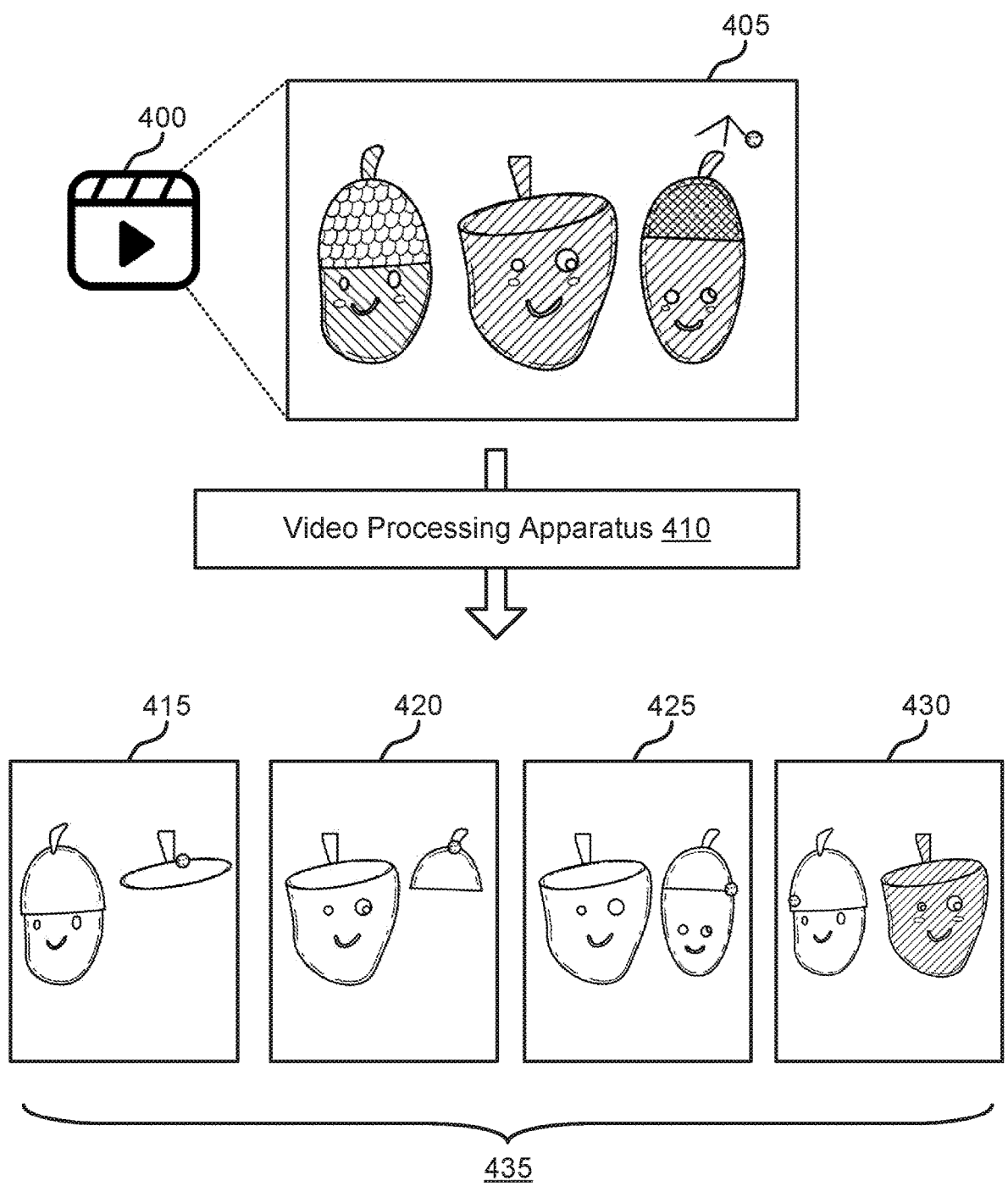
FIG. 4 shows an example of timelapse video generation according to aspects of the present disclosure.

FIG. 4 shows an example of timelapse video generation including modified frames following stroke inputs according to aspects of the present disclosure. The example shown includes input video 400, video processing apparatus 410, first modified frame 415, second modified frame 420, third modified frame 425, fourth modified frame 430, and output video 435. Video processing apparatus 410 is an example of, or includes aspects of, the corresponding element described with reference to FIGS. 1 and 6.

In some examples, a user initiates, via an image editing interface, a drawing session. The user draws multiple boy figures on a canvas within the drawing session. The set of boy figures includes cartoon-style faces. The drawing session is captured in a timelapse video such as input video 400.

In some embodiments, video processing apparatus 410 receives input video 400 comprising a set of original frames. Input video 400 includes original frame 405 that depicts fruits and vegetables. Video processing apparatus 410 takes input video 400 and generates output video 435 that comprises at least four frames, as an example. Output video 435 includes first modified frame 415, second modified frame 420, third modified frame 425, fourth modified frame 430. Video processing apparatus 410 follows and preserves the drawing strokes of users. That is, users' creative process is preserved. In some examples, a user draws on a canvas, and the frames in output video 435 (e.g., a timelapse video) focus on the user's strokes and the drawing process. First modified frame 415, second modified frame 420, third modified frame 425, and fourth modified frame 430 record and preserve the user's strokes and the actual focus points of the drawing. In the meantime, first modified frame 415, second modified frame 420, third modified frame 425, and fourth modified frame 430 have the same target dimensions (aspect ratio) that are different from an original aspect ratio of original frame 405. Output video 435 fits into the aspect ratio of video templates on a social medium platform. Output video 435 is uploaded to the social media platform for publishing.

Input video 400 is an example of, or includes aspects of, the corresponding element described with reference to FIG. 9. Original frame 405 is an example of, or includes aspects of, the corresponding element described with reference to FIG. 3.

Figure 5:
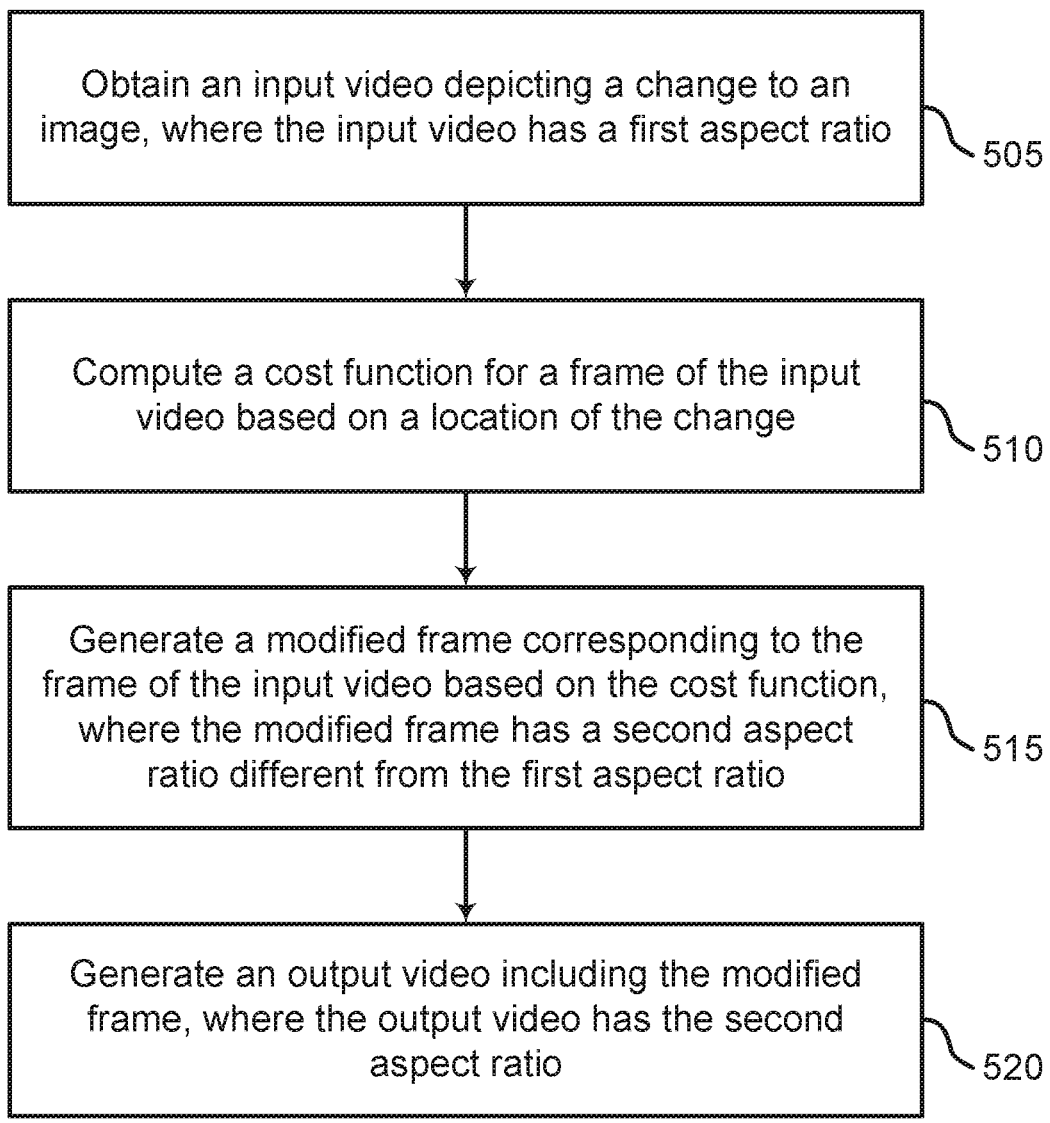
FIG. 5 shows an example of a method for video processing according to aspects of the present disclosure.

FIG. 5 shows an example of a method 500 for video processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system obtains an input video depicting a change to an image, where the input video has a first aspect ratio. In some cases, the operations of this step refer to, or may be performed by, a user interface as described with reference to FIG. 1.

In some examples, users initiate a drawing session, via sketching and drawing applications (e.g., Fresco), to generate image/video products using numerous pixel and vector brushes, alongside their unique interactions. In some examples, file format such as png and jpg is one way to share digital product, a timelapse video serves to interact with users' audiences on different social media platforms (e.g., Snapchat®, Instagram®, TikTok®, Facebook®, YouTube®).

In some examples, the input video is a timelapse video. Timelapse videos are created by capturing the entire canvas for each frame. In some cases, a timelapse video needs to be resized (e.g., change the original aspect ratio to a target aspect ratio that is different from the original aspect ratio) to fit different social media platforms' video templates.

At operation 510, the system computes a cost function for a frame of the input video based on a location of the change. In some cases, the operations of this step refer to, or may be performed by, an optimization model as described with reference to FIGS. 6 and 7.

In an embodiment, the optimization model is configured to penalize cost of moving the window every frame and impose higher penalty for cuts from one frame to another frame (e.g., cut occurred when moving from a first frame to a second frame). This cost is tracked across the length of the video. Additionally, the optimization model, via calculating the cost function, enables static, linear, and/or parabolic sections in the timelapse video as the video involves jumping frames and panning from one proposed window position to another proposed window position.

In an embodiment, the video processing apparatus includes an in-application and fast dynamic programming for re-targeting video of one aspect ratio to another aspect ratio. This leads to increased consumption and usage of sketching and drawing applications (e.g., Fresco). The information and data for optimization is extracted and stored as users are drawing on a canvas, the action of exporting a timelapse video to certain aspect ratio is fast.

At operation 515, the system generates a modified frame corresponding to the frame of the input video based on the cost function, where the modified frame has a second aspect ratio different from the first aspect ratio. In some cases, the operations of this step refer to, or may be performed by, a frame editing component as described with reference to FIGS. 6 and 7.

In some embodiments, the video processing model preserves the important part of an input video and eliminates the redundant part of the input video. The video processing model takes stroke inputs from a user and other user actions into account. The video processing model, via an optimization model, generates a modified timelapse video.

In some examples, the video processing model takes user stroke data as input and user undo/redo actions from a drawing session. The video processing model generates a cropping window encompassing maximal information per discrete time. The optimization model penalizes abrupt panning and jump cuts that are jarring in short successions.

At operation 520, the system generates an output video including the modified frame, where the output video has the second aspect ratio. In some cases, the operations of this step refer to, or may be performed by, a video generation component as described with reference to FIGS. 6 and 7.

In some embodiments, the video processing apparatus incorporates user strokes data and frame data per timestamp while a user is engaged in a drawing session on a drawing application. The video processing apparatus utilizes user strokes data and frame data to penalize not showing the relevant user strokes and salient information. Additionally or alternatively, the video processing apparatus tracks assets which are not part of a video output to enable not focusing on them early on.

In some examples, the video processing apparatus, via an optimization model, adds regularization on the approximate window possibilities to provide a smooth viewing experience by creating static, linear, and parabolic segments. The video processing apparatus preserves what is important in the video by removing what is not based on user strokes and user actions as the measurement of importance. Detail regarding optimization process is described below in FIGS. 8-11. Systems and methods based on the present disclosure enable user intent-driven resizing, enabling converting a video from a first aspect ratio to another, while preserving actual drawing points (e.g., stroke inputs, interaction with a canvas during a drawing session) from the viewer's and creator's point of view.

Model Architecture

Figure 6:
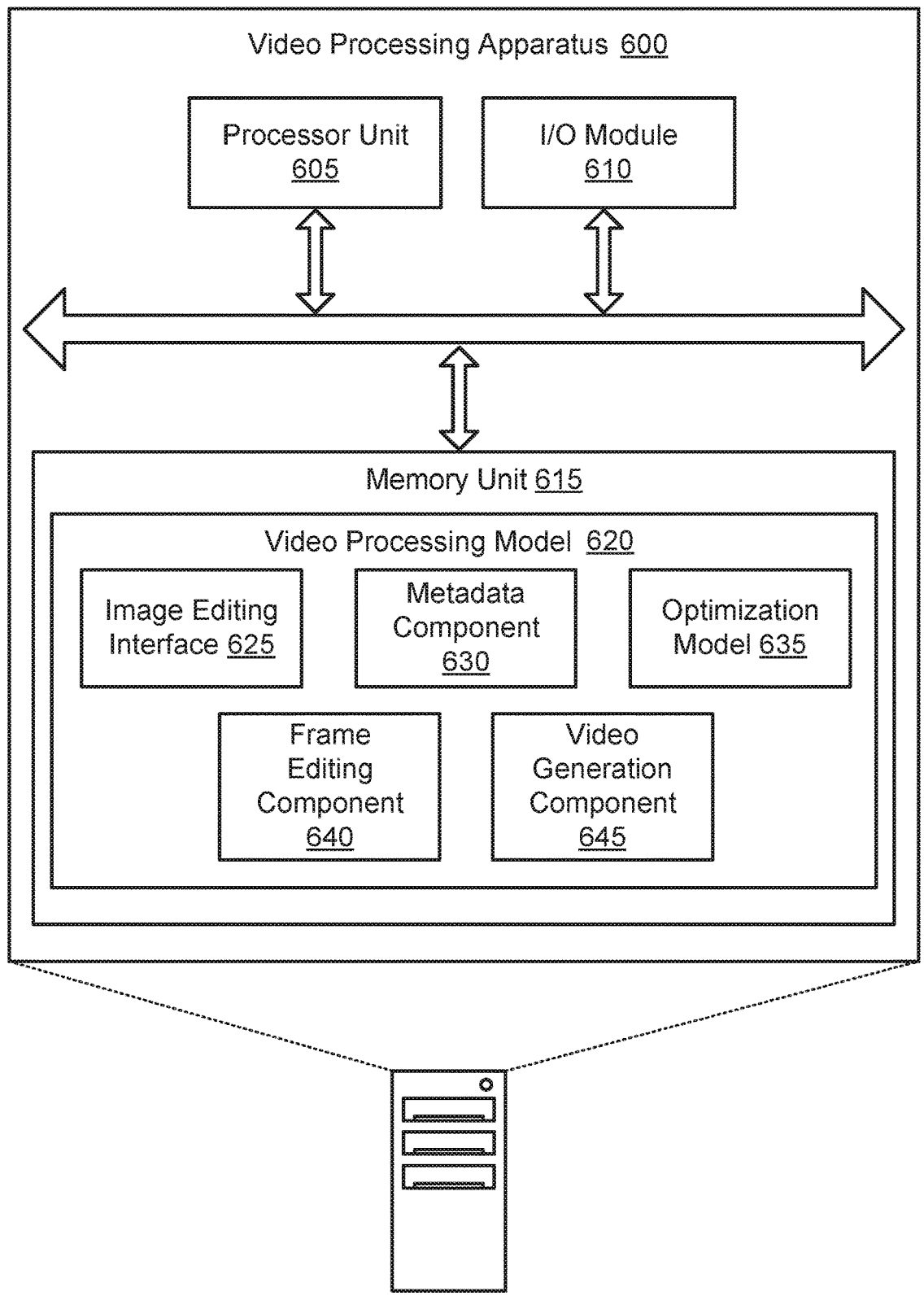
FIG. 6 shows an example of a video processing apparatus according to aspects of the present disclosure.
Figure 7:
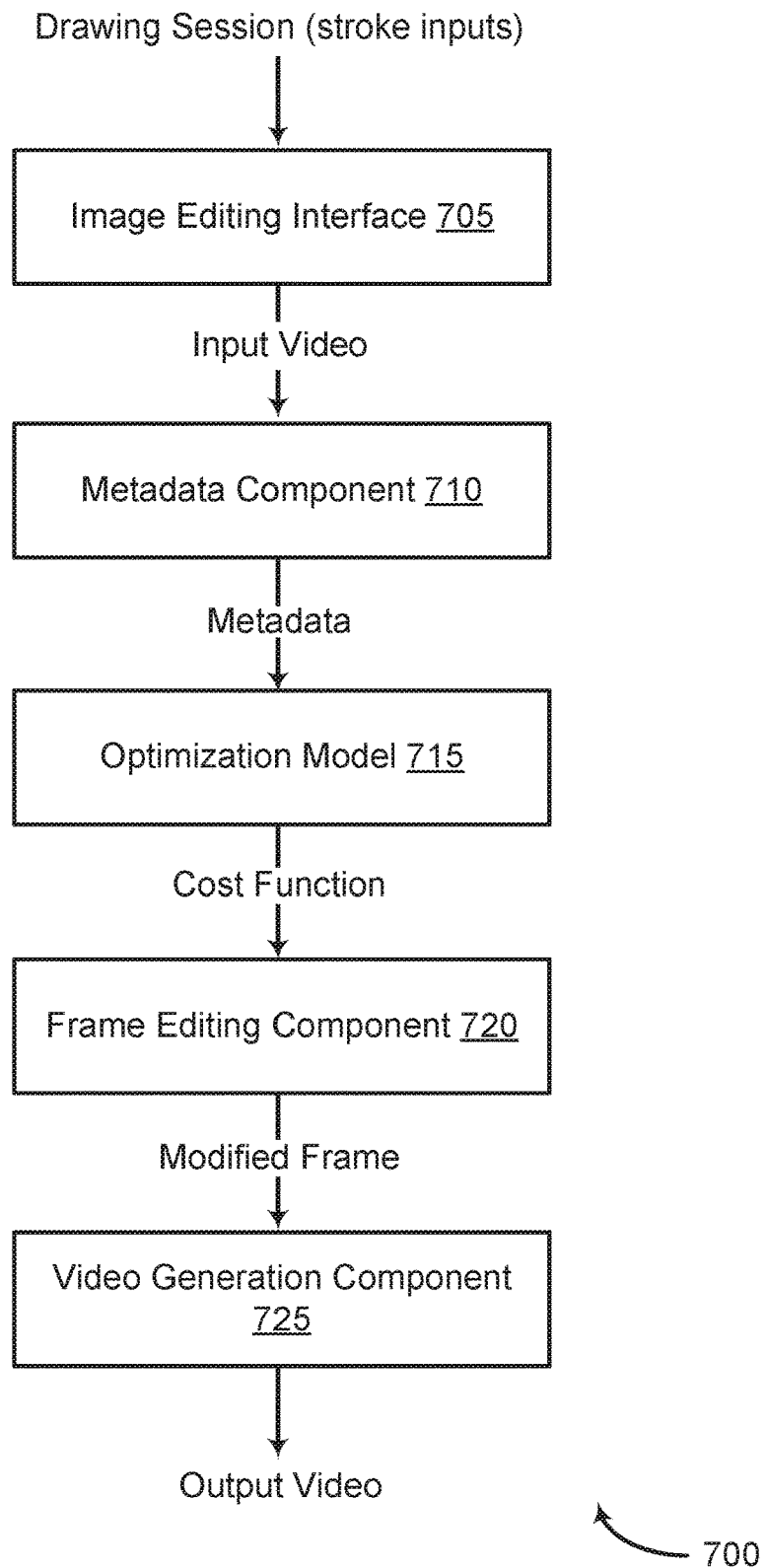
FIG. 7 shows an example of a video processing model according to aspects of the present disclosure.

In FIGS. 6-7, an apparatus and method for video processing are described. One or more embodiments of the apparatus and method include at least one processor; at least one memory including instructions executable by the at least one processor; an optimization model comprising parameters stored in the at least one memory and configured to compute a cost function for a frame of an input video based on a location of a change, wherein the input video has a first aspect ratio; a frame editing component comprising parameters stored in the at least one memory and configured to generate a modified frame corresponding to the frame of the input video based on the cost function, wherein the modified frame has a second aspect ratio different from the first aspect ratio; and a video generation component comprising parameters stored in the at least one memory and configured to generate an output video including the modified frame, wherein the output video has the second aspect ratio.

Some examples of the apparatus and method further include a metadata component configured to obtain metadata for the input video including the location. Some examples of the apparatus and method further include an image editing interface configured to initiate a drawing session and receive a plurality of stroke inputs from a user, wherein the metadata includes location information for each of the plurality of stroke inputs.

In some examples, the optimization model computes a regularization term for the frame of the input video based on the cost function, wherein the modified frame is generated based on the regularization term.

FIG. 6 shows an example of a video processing apparatus 600 according to aspects of the present disclosure. The example shown includes video processing apparatus 600, processor unit 605, I/O module 610, and memory unit 615. Video processing apparatus 600 is an example of, or includes aspects of, the corresponding element described with reference to FIGS. 1 and 4.

Video processing model 620 is an example of, or includes aspects of, the corresponding element described with reference to FIG. 7. In one embodiment, video processing model 620 includes image editing interface 625, metadata component 630, optimization model 635, frame editing component 640, and video generation component 645.

Processor unit 605 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 605 is configured to operate a memory array using a memory controller. In other cases, a memory controller is integrated into the processor. In some cases, processor unit 605 is configured to execute computer-readable instructions stored in a memory to perform various functions. In some embodiments, processor unit 605 includes special purpose components for modem processing, baseband processing, digital signal processing, or transmission processing.

Examples of memory unit 615 include random access memory (RAM), read-only memory (ROM), or a hard disk. Examples of memory unit 615 include solid state memory and a hard disk drive. In some examples, memory unit 615 is used to store computer-readable, computer-executable software including instructions that, when executed, cause a processor to perform various functions described herein. In some cases, memory unit 615 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 615 store information in the form of a logical state.

In some examples, at least one memory unit 615 includes instructions executable by the at least one processor unit 605. Memory unit 615 includes video processing model 620 or stores parameters of video processing model 620.

I/O module 610 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 610 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments, image editing interface 625 initiates a drawing session. In some examples, image editing interface 625 receives a set of stroke inputs from a user, where the metadata includes location information for each of the set of stroke inputs. Image editing interface 625 is an example of, or includes aspects of, the corresponding element described with reference to FIG. 7.

According to some embodiments, metadata component 630 obtains metadata for the input video including the location. In some examples, metadata component 630 assigns a timestamp to each of the set of stroke inputs, where the metadata includes the timestamp. In some aspects, the metadata includes a velocity parameter, a pressure parameter, an altitude parameter, an azimuth parameter, or a combination thereof, for at least one of the set of stroke inputs. Metadata component 630 is an example of, or includes aspects of, the corresponding element described with reference to FIG. 7.

According to some embodiments, optimization model 635 computes a cost function for a frame of the input video based on a location of the change. In some examples, optimization model 635 obtains saliency information for the modified frame, where the cost function is based on the saliency information. In some examples, optimization model 635 computes a transition cost for the modified frame based on a previous frame, where the cost function is based on the transition cost. In some examples, optimization model 635 computes a regularization term for the frame of the input video based on the cost function, where the modified frame is generated based on the regularization term.

According to some embodiments, optimization model 635 includes parameters stored in the at least one memory and is configured to compute a cost function for a frame of an input video based on a location of a change, wherein the input video has a first aspect ratio. Optimization model 635 is an example of, or includes aspects of, the corresponding element described with reference to FIG. 7.

According to some embodiments, frame editing component 640 generates a modified frame corresponding to the frame of the input video based on the cost function, where the modified frame has a second aspect ratio different from the first aspect ratio. Frame editing component 640 is an example of, or includes aspects of, the corresponding element described with reference to FIG. 7.

According to some embodiments, video generation component 645 generates an output video including the modified frame, where the output video has the second aspect ratio. Video generation component 645 is an example of, or includes aspects of, the corresponding element described with reference to FIG. 7.

FIG. 7 shows an example of a video processing model 700 according to aspects of the present disclosure. The example shown includes video processing model 700, image editing interface 705, metadata component 710, optimization model 715, frame editing component 720, and video generation component 725. Video processing model 700 is an example of, or includes aspects of, the corresponding element described with reference to FIG. 6.

In some embodiments, an image editing interface 705 is configured to initiate a drawing session and receive a set of stroke inputs from a user, where the metadata includes location information for each of the set of stroke inputs. Image editing interface 705 is an example of, or includes aspects of, the corresponding element described with reference to FIG. 6. An input video is converted from the drawing user journey via image editing interface 705. For example, the input video is a timelapse video. In some cases, the input video depicts a change to an image and the input video has a first aspect ratio.

In some embodiments, a metadata component 710 is configured to obtain metadata for the input video including the location. Metadata component 710 is an example of, or includes aspects of, the corresponding element described with reference to FIG. 6.

Optimization model 715 computes a cost function for a frame of the input video based on a location of the change. Optimization model 715 is an example of, or includes aspects of, the corresponding element described with reference to FIG. 6.

Frame editing component 720 generates a modified frame corresponding to the frame of the input video based on the cost function, where the modified frame has a second aspect ratio different from the first aspect ratio. Frame editing component 720 is an example of, or includes aspects of, the corresponding element described with reference to FIG. 6.

Video generation component 725 generates an output video including the modified frame, wherein the output video has the second aspect ratio. Video generation component 725 is an example of, or includes aspects of, the corresponding element described with reference to FIG. 6.

Video Generation Optimization

Figure 8:
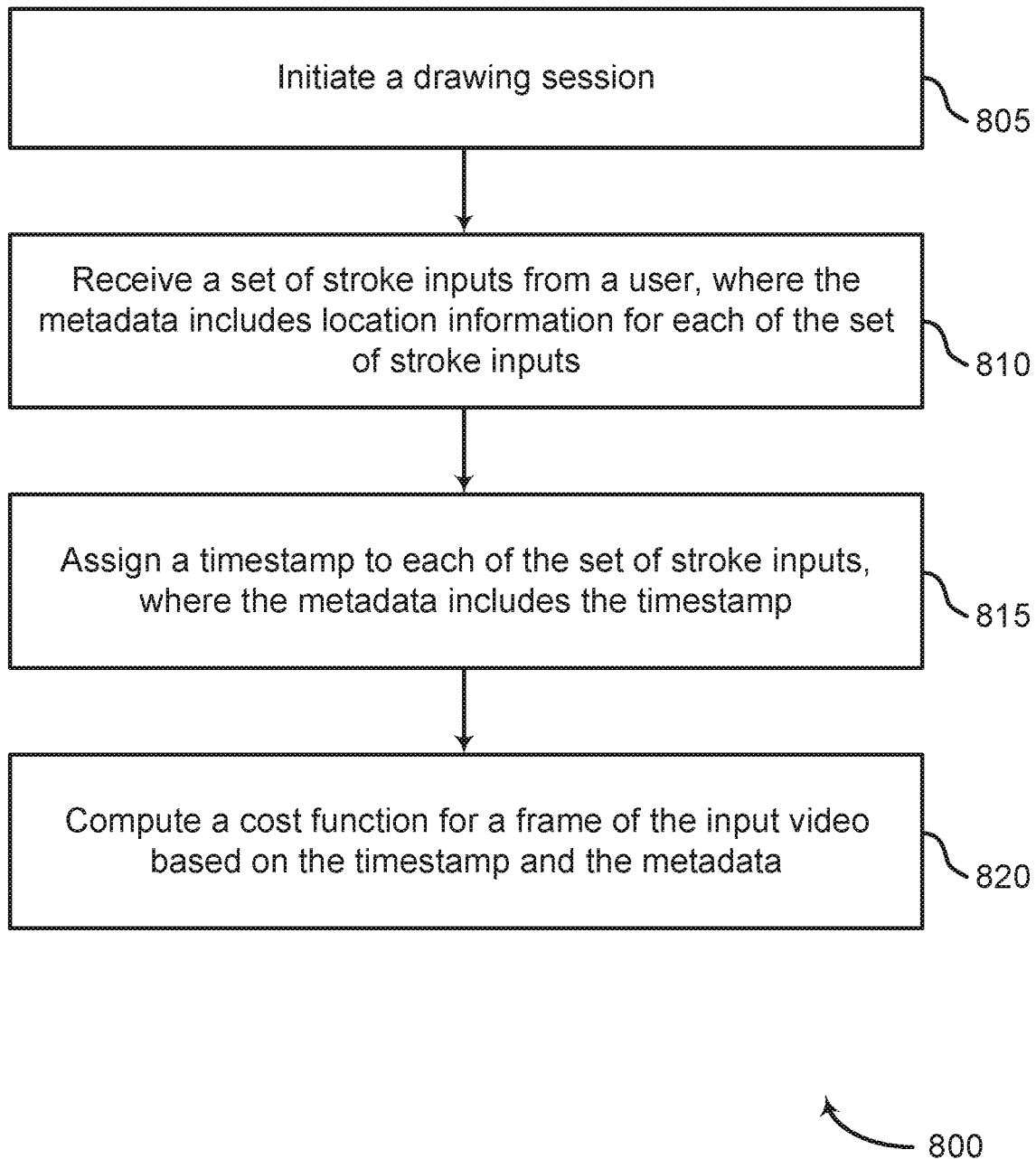
FIG. 8 shows an example of a method for computing a cost function according to aspects of the present disclosure.

FIG. 8 shows an example of a method 800 for computing a cost function according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system initiates, via an image editing interface, a drawing session. In some cases, the operations of this step refer to, or may be performed by, an image editing interface as described with reference to FIGS. 6 and 7. In some examples, a user initiates a drawing session on an image editing application. A timelapse video is generated based on user interactions with the drawing session. In some examples, the timelapse video has a duration shorter than the actual length of the drawing session.

At operation 810, the system receives a set of stroke inputs from a user, where the metadata includes location information for each of the set of stroke inputs. In some cases, the operations of this step refer to, or may be performed by, an image editing interface as described with reference to FIGS. 6 and 7.

In some examples, the size of the drawing canvas is [w, h] and the target aspect ratio is [W, H]. A drawing application may convert a drawing session (interaction on a drawing canvas) to a timelapse video of size [w, h]. In some embodiments, the timelapse video is scaled in height dimension, and optimization is performed per discrete time for the width dimension. For example at a time step, the video processing model, via an optimization model, generates a value of $o_t \in [1:w*scale-W]$ to select cropping window position(s) among a list of possible cropping window positions, where w is the original width and scale is H/h.

In some embodiments, the video processing model receives user stroke information, canvas frame information, saliency area, and image asset import/delete information during the drawing session (also referred to as a user journey). The optimization model predicts the optimal cropping window based on the received information and associated metadata. In some examples, data collection is done for a time period of t:[1:N].

At operation 815, the system assigns a timestamp to each of the set of stroke inputs, where the metadata includes the timestamp. In some cases, the operations of this step refer to, or may be performed by, a metadata component as described with reference to FIGS. 6 and 7.

At operation 820, the system computes a cost function for a frame of the input video based on the timestamp and metadata. In some cases, the operations of this step refer to, or may be performed by, an optimization model as described with reference to FIGS. 6 and 7.

In some embodiments, the optimization process is formulated as follows to minimize a cost function:

$$C() = \sum_{t=1}^{N} C_{st}(o_t, S_t) + \sqrt[3]{\sum_{t=1}^{N} C_{sa}(o_t, S_t)} + \lambda \sum_{t=2}^{N} C_{tr}(o_{t-1}, o_t, d) \quad (1)$$

$C_{st}$ is the cost for deviating from user stroke data at each frame. The cost function takes the crop value and the current stroke value as input. The cost function for deviating from user stroke is the L2 measurement of the distance between the original canvas center and the stroke point X, Y and the distance between the target center and the stroke point X, Y. In some embodiments, the cost function is formulated as follows:

$$C_{st} = (\|(X_i Y_i) - (c_x c_y)\|_2 - \|(X_i Y_i) - (t_x t_y)\|_2)^2 \quad (2)$$

where $c_x$ and $c_y$ are the coordinates of the original canvas center, $t_x$ and $t_y$ are the coordinates of the target center, and $(X_i, Y_i)$ denotes the coordinates of the i-th stroke point.

The cost function calculates the difference between the L2 distance between the canvas center and stroke point $(X_i, Y_i)$ and the L2 distance between the target center and the same stroke point $(X_i, Y_i)$, and returns the sum of squared differences over all data points.

In some embodiments, $C_{sa}$ is the cost of deviating from frame saliency data at each frame. The optimization model calculates a $\sqrt[3]{}$ of this cost to assign lesser weight than the user stroke data. In some embodiments, the cost function is formulated as follows:

$$C_{sa} = (\|(S_i S_i) - (c_x c_y)\|_2 - \|(S_i S_i) - (t_x t_y)\|_2)^2 \quad (3)$$

where $c_x$ and $c_y$ are the coordinates of the canvas center, $t_x$ and $t_y$ are the coordinates of the target center, and $(S_i, S_i)$ denotes the coordinates of the i-th saliency point.

The cost function calculates the difference between the L2 distance between the canvas center and stroke point $(S_i, S_i)$ and the L2 distance between the target center and the same saliency point $(S_i, S_i)$, and returns the sum of squared differences over all data points.

In some embodiments, $C_{tr}$ represents the transition cost, which computes the cost of transition from one state to the other. The pair-wise cost $C_{tr}$ considers a case-wise penalty. The transition cost depends on whether there is a new cut introduced. If there is a new cut introduced (i.e., $|o_t - o_{t-1}| > W$), the transition cost is set up based on the new cut (i.e., stay there for a minimum time). If there is no cut introduced (i.e., $|o_t - o_{t-1}| \leq W$), the transition cost function is configured based on the previous state (i.e., stay near the previous state). In some embodiments, the transition cost is formulated as follows:

$$C_{tr}(o_{t-1}, o_t, d) = \begin{cases} 1 - e^{-4|o_t - o_{t-1}|/W} & \text{if } |o_t - o_{t-1}| \leq W \\ 1 + e^{-|d|/D} & \text{if } |o_t - o_{t-1}| > W \end{cases} \quad (4)$$

where d is the duration from the previous cut and D is an application-controlled parameter for tuning the cut sequences.

When the states differences are less than W, the transition cost is 0 when $o_t = o_{t-1}$ and gradually increases to 1 when the difference becomes close to W. When the value of $|o_t - o_{t-1}|$ is more than W, there is a possible cut introduced, and the transition cost is driven by the previous cut. When $|o_t - o_{t-1}| > W$, the transition cost decreases gradually with the increase in the duration d.

In some embodiments, the optimization process is summarized as solving Eq. (1) using dynamic programming, where the optimization model selects a state $o_t$ from the possible positions w*scale−W. The optimization model computes the cost matrix for each time possible and each output possibility. The cost function is formulated as follows:

$$C(o_t, t) = \begin{cases} C_{st}(o_t, S_t) + C_{sa}(o_t, Sa_t), & \text{if } t = 1 \\ \min_{r_{t-1}} [C_{st}(o_t, S_t) + \sqrt[3]{C_{sa}(o_t, S_t)} + \\ \lambda C_{tr}(o_{t-1}, o_t, d) + C(o_{t-1}, t-1)], & \text{if } t > 1 \end{cases} \quad (5)$$

In some embodiments, the optimization model calculates the cost for each node and utilizes backtracking to solve and output the final window at each step.

The optimization model computes a regularization term for the frame of the input video based on the cost function, where the modified frame is generated based on the regularization term. In one or more embodiments of the present disclosure, the optimization model computes the possible lowest cost windows per time stamp and then further computes a regularization term for a smooth viewing experience based on the cost function.

In some embodiments, three penalties are added to compute the regularization term. In some examples, when $L^1$ norm term is added to the objective to be minimized or constrained, the solution has the argument of the $L^1$ norm term sparse (i.e., with many exactly zero elements). The first term penalizes the $L^1$ norm over the first-order derivative to induce static segments. The first term is formulated as follows:

$$M_1(\xi) = \sum_{t=1}^{N-1} |x_{t+1} - x_t| \quad (6)$$

The second term induces constant velocity segments by minimizing accelerations and is formulated as follow:

$$M_2(\xi) = \sum_{t=1}^{N-2} |x_{t+2} - 2x_{t+1} + x_t| \qquad (7)$$

The third term minimizes jerk, leading to segments of constant acceleration and is formulated as follow:

$$M_3(\xi) = \sum_{t=1}^{N-3} |x_{t+3} - 3x_{t+2} + 3x_{t+1} - 3x_t| \qquad (8)$$

The optimization model combines the three penalties to yield a camera comprising distinct static, linear, and parabolic segments.

Figure 9:
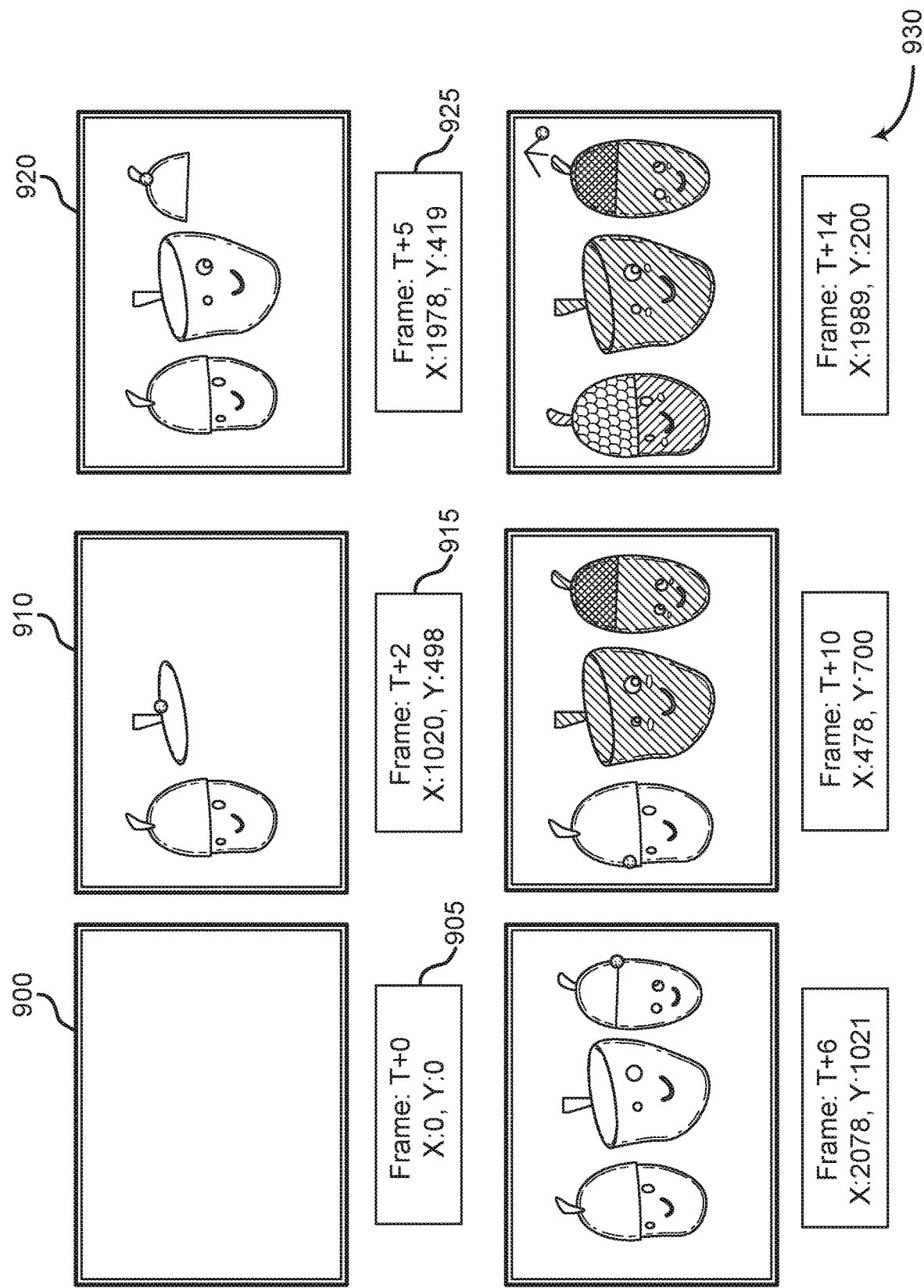
FIG. 9 shows an example of a user journey including stroke inputs and saliency information according to aspects of the present disclosure.

FIG. 9 shows an example of user journey including stroke inputs and saliency information according to aspects of the present disclosure. The example shown includes first frame 900, first stroke information 905, second frame 910, second stroke information 915, third frame 920, third stroke information 925, and input video 930. Input video 930 is an example of, or includes aspects of, the corresponding element described with reference to FIG. 4.

In some embodiments, the video processing model (see FIGS. 6-7) captures user strokes information at each timestamp and generates a re-targeted (modified) video which maximizes showing the active designer's interface with the drawing application and also the output video is regularized to be smooth and pleasant. To do this, the video processing model formulates an optimization task by enabling an L2 cost tracked over a sequence of frames.

In some embodiments, user strokes are stored by saving the position of the user touch on a canvas and other drawing parameters with timestamps added to the user touch positions and other drawing parameters during a drawing session. This information is stored in a format such as JSON file in persistent memory (e.g., memory unit 615 described in FIG. 6) and is used to retarget the original timelapse video. In some examples, the JSON file contains X and Y coordinates of the user's touch positions (drawing points) for each frame and the timestamps at which the user made the strokes. An example of the saved user stroke information is presented as follows:

```
{   "x": 204,
    "y": 578,
    "timestamp": 62452,
    "velocity": 24.77,
    "pressure": 0.34,
    "altitude": 0
    "azimuth": 1.34  }
```

The saved user stroke information is formulated as follows:

$$S_t \in [1:N] \qquad (9)$$

In some embodiments, the video processing model extracts canvas frame information by capturing complete canvas frame screenshots of size [w, h]. Canvas frame information is stored in persistent memory over discrete time during the drawing session. The saved canvas frame information is formulated as follows:

$$F_t \in [1:N] \qquad (10)$$

Referring to an example in FIG. 9, input video 930 is a timelapse video depicting a drawing session. Input video 930 includes a sequence of frames. FIG. 9 shows first frame 900, second frame 910, and third frame 920 in a chronological order and the three frames are arranged on the first row. Three more frames are arranged on the second row in a chronological order. The six frames are shown for illustrative purposes and input video 930 may include more than six frames.

First frame 900 includes an empty canvas. First stroke information 905 includes location information (X:0, Y:0) for a stroke input at frame T+0. Second frame 910 includes a set of stroke inputs. Second stroke information 915 includes location information (X:1020, Y:498) for a stroke input at frame T+2. Third frame 920 includes the set of stroke inputs and one or more additional stroke inputs. Third stroke information 925 includes location information (X:1978, Y:419) for a stroke input at frame T+5. In some cases, at frame T+0, frame T+2, and T+5, a timestamp is assigned to each corresponding stroke input.

Figure 10:
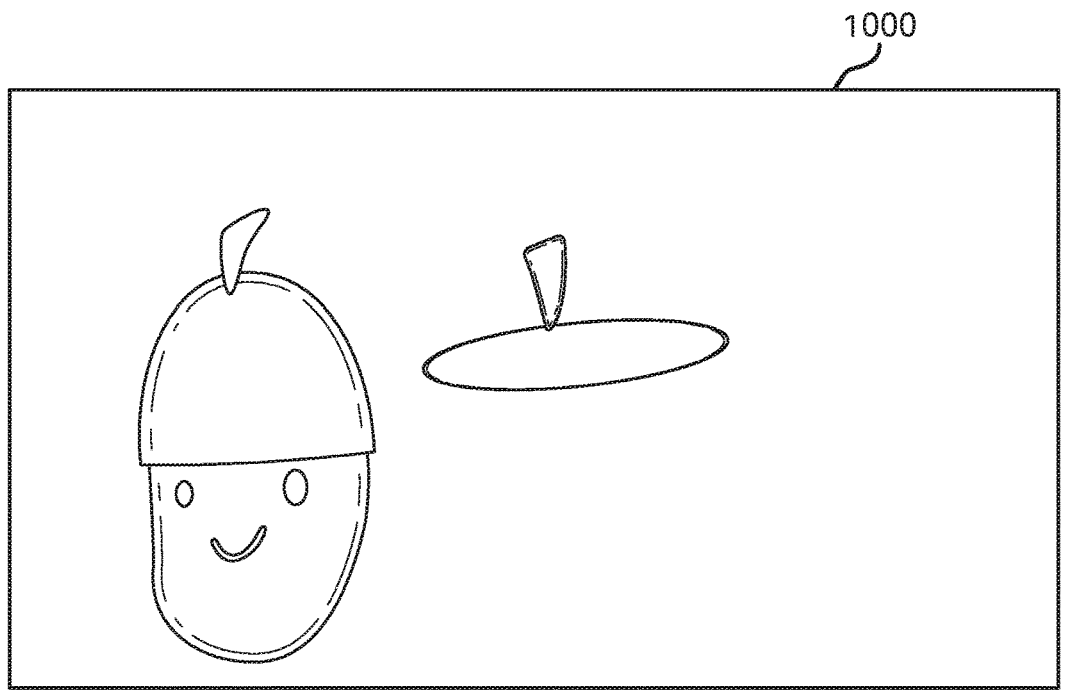
FIG. 10 shows an example of a canvas frame at a discrete timestamp and saliency information according to aspects of the present disclosure.
Figure 10:
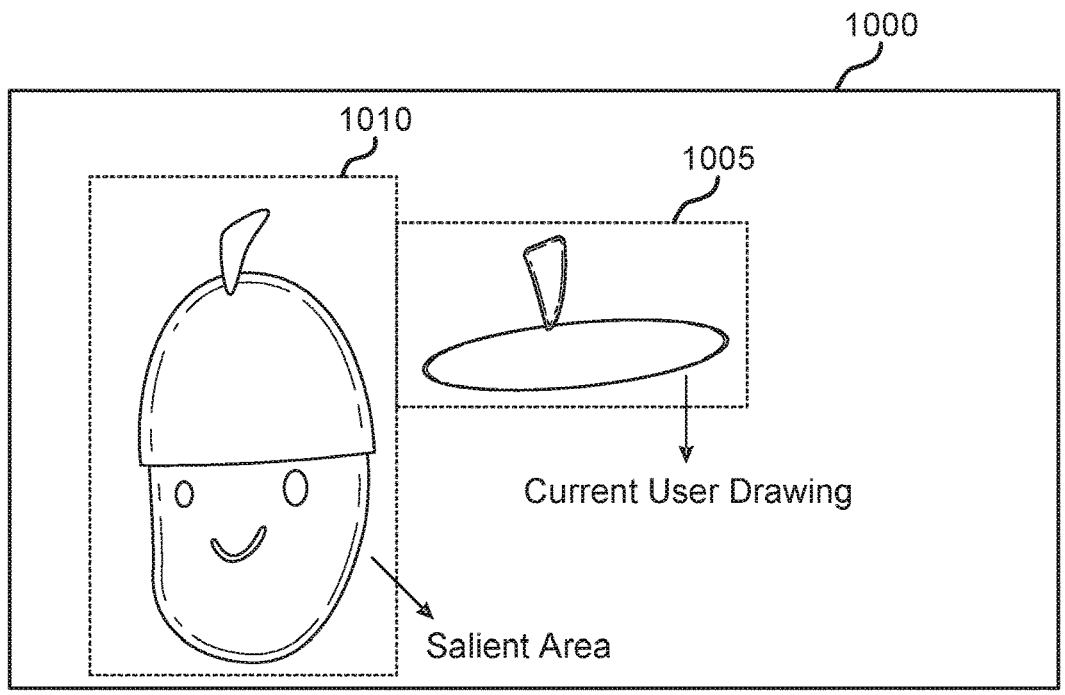

FIG. 10 shows an example of a canvas frame at a discrete timestamp and saliency information according to aspects of the present disclosure. The example shown includes frame 1000, current stroke input 1005, and salient area 1010. Frame 1000 is an example of, or includes aspects of, the corresponding element described with reference to FIG. 11.

In some examples, the video processing model, via an optimization model, takes into account saliency area at optimization. In some embodiments, a pre-trained multilayer perceptron (MLP) neural network (e.g., DeepGaze II) is configured to output a saliency map for each captured frame screenshot per discrete time. The saliency information enables capturing other areas of interest apart from user strokes and maximizing the appearance of these areas of interest over blank space appearance. The saliency area is formulated as follows:

$$SA_t \in [1:N] \qquad (11)$$

According to some embodiments of the present disclosure, the video processing model includes a computer implemented artificial neural network (ANN) for generating a saliency map for each of a set of captured frames. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

An MLP is a feed forward neural network that typically includes multiple layers of perceptrons. Each component of the perceptron layer may include an input layer, one or more hidden layers, and an output layer. Each node may include a nonlinear activation function. An MLP may be trained using backpropagation (i.e., computing the gradient of the loss function with respect to the parameters).

In an embodiment, the optimization model extracts salient information at each timestamp from the captured frame and adds in the tracked cost function with a factor of V to up-level the other salient features in the video rather than empty spaces. The video processing model keeps the window that first tracks actual user interaction and then the other salient drawing in the frame.

In an example shown in FIG. 10, the video processing model tracks current stroke input 1005 (e.g., current user drawing at a timestamp) and extracts salient information (salient area 1010) from frame 1000.

Figure 11:
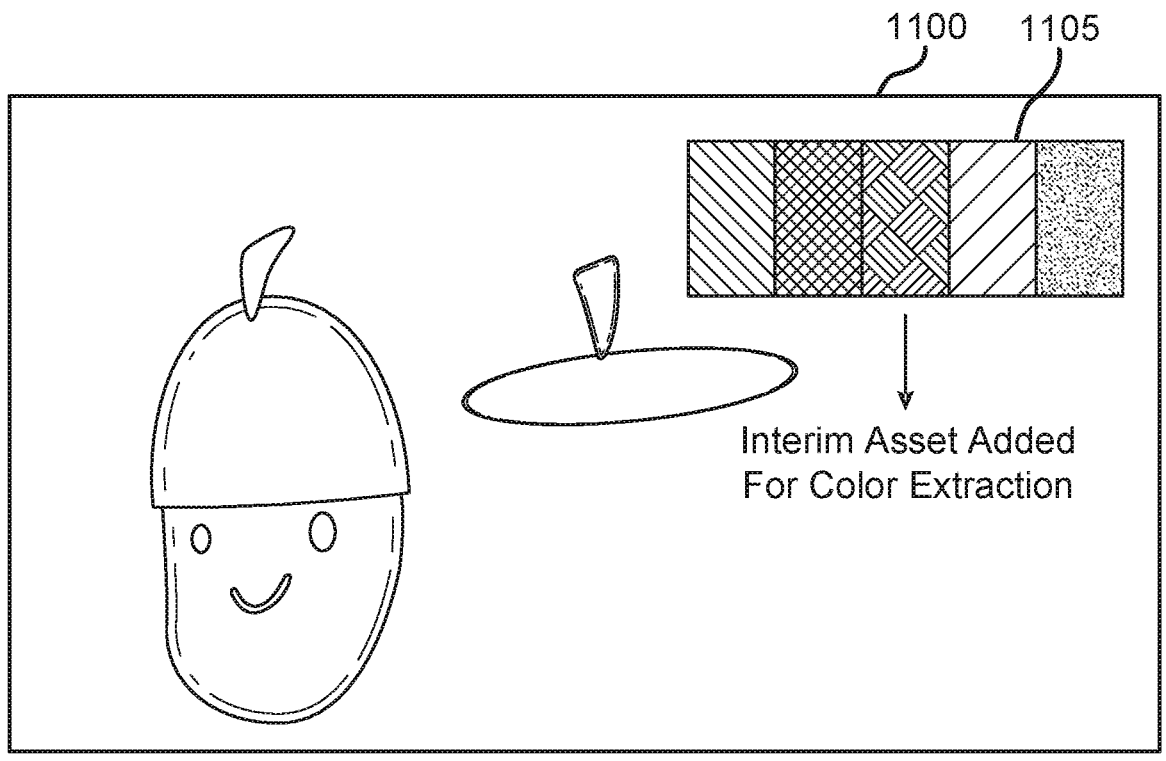
FIG. 11 shows an example of asset import according to aspects of the present disclosure.

FIG. 11 shows an example of asset import during a drawing session according to aspects of the present disclosure. The example shown includes frame 1100 and asset import 1105. Frame 1100 is an example of, or includes aspects of, the corresponding element described with reference to FIG. 10.

In some embodiments, the video processing model tracks interim assets that are added for extracting colors and shapes and are not displayed for viewing in an output video. The video processing model tracks this information by tracking addition and removal of such image assets and removes all such salient areas from the output video by back-tracing to past times. Accordingly, the output video focuses more on the active drawing area.

In some examples, frame 1100 of a video includes asset import 1105 that is displayed for user interaction during a drawing session. That is, asset import 1105 pops up as interim asset for color extraction (e.g., a color palette is displayed on the upper right-hand of a canvas during the drawing session). Asset import 1105 is not intended to appear in the output video.

In some embodiments, with regards to image asset import/delete, the video processing model tracks and stores user actions information related to image asset import and deletion on the canvas (e.g., asset import 1105). In some examples, users, during a drawing session, put reference images on the canvas for extracting assets (e.g., colors and fonts) or for the purpose of sparking inspiration. There is no timelapse viewer value in keeping these assets in the timelapse video. In some examples, the video processing model tracks the reference images (bounding box areas) and eliminates the reference images from the saliency area in discrete times if the reference images (bounding box areas) are deleted in the end. A bounding box area includes a reference image. In some cases, bounding box areas are also referred to as BBOX areas.

Figure 12:
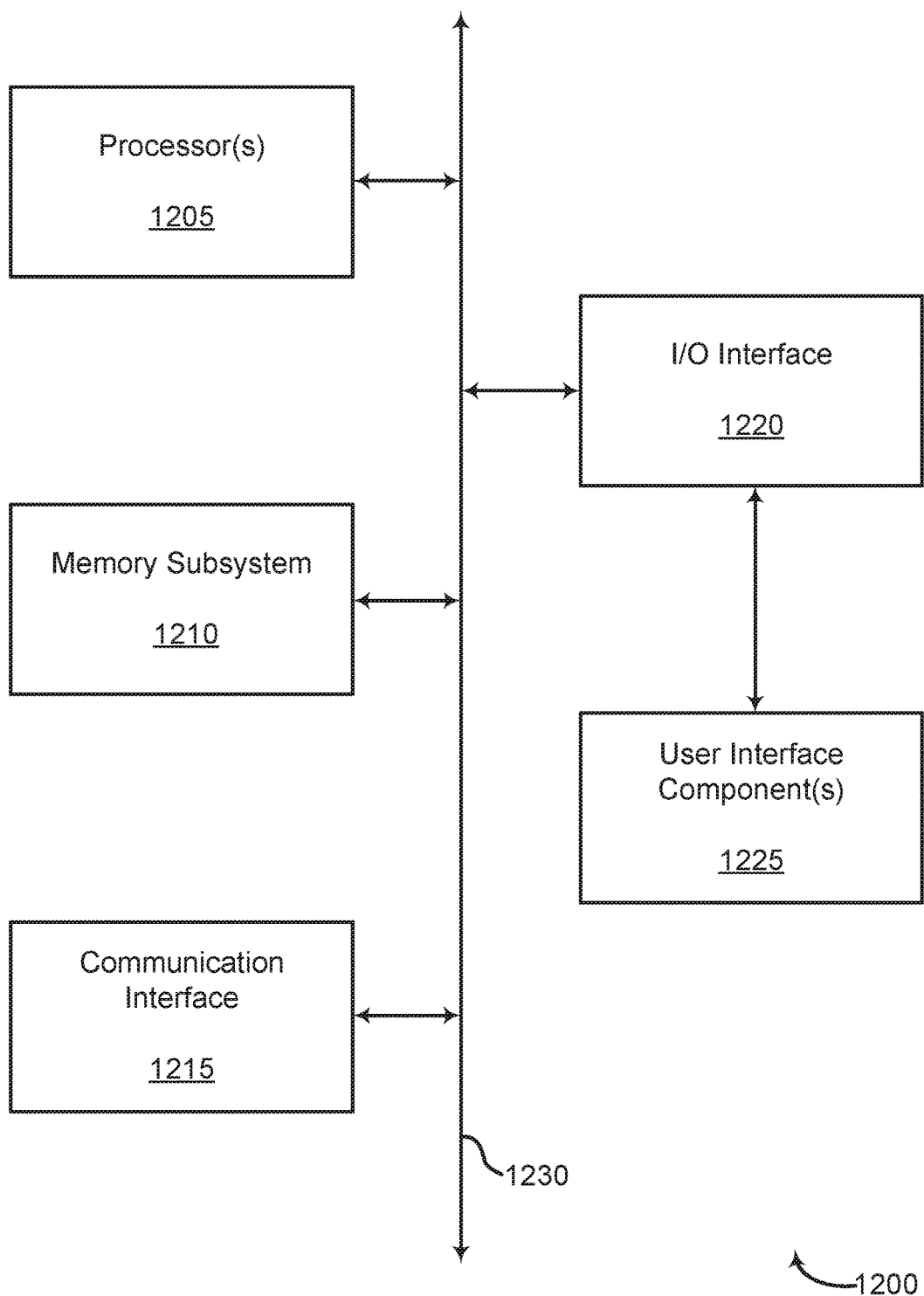
FIG. 12 shows an example of a computing device for video processing according to aspects of the present disclosure.

FIG. 12 shows an example of a computing device 1200 for video processing according to aspects of the present disclosure. The example shown includes computing device 1200, processor(s) 1205, memory subsystem 1210, communication interface 1215, I/O interface 1220, user interface component(s) 1225, and channel 1230. In one embodiment, computing device 1200 includes processor(s) 1205, memory subsystem 1210, communication interface 1215, I/O interface 1220, user interface component(s) 1225, and channel 1230.

In some embodiments, computing device 1200 is an example of, or includes aspects of, video processing apparatus 110 of FIG. 1. In some embodiments, computing device 1200 includes one or more processors 1205 that can execute instructions stored in memory subsystem 1210 to obtain an input video depicting a change to an image, wherein the input video has a first aspect ratio; compute a cost function for a frame of the input video based on a location of the change; generate a modified frame corresponding to the frame of the input video based on the cost function, wherein the modified frame has a second aspect ratio different from the first aspect ratio; and generate an output video including the modified frame, wherein the output video has the second aspect ratio.

According to some embodiments, computing device 1200 includes one or more processors 1205. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1215 operates at a boundary between communicating entities (such as computing device 1200, one or more user devices, a cloud, and one or more databases) and channel 1230 and can record and process communications. In some cases, communication interface 1215 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1220 is controlled by an I/O controller to manage input and output signals for computing device 1200. In some cases, I/O interface 1220 manages peripherals not integrated into computing device 1200. In some cases, I/O interface 1220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1220 or via hardware components controlled by the I/O controller.

According to some embodiments, user interface component(s) 1225 enable a user to interact with computing device 1200. In some cases, user interface component(s) 1225 include an audio device, such as an external speaker system, an external display device such as a display screen, an input device (e.g., a remote control device interfaced with a user interface directly or through the I/O controller), or a combination thereof. In some cases, user interface component(s) 1225 include a GUI.

Performance of apparatus, systems and methods of the present disclosure have been evaluated, and results indicate embodiments of the present disclosure have obtained increased performance over existing technology. Example experiments demonstrate that the video processing apparatus based on the present disclosure outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   obtaining an input video depicting a change to an image, wherein the input video has a first aspect ratio;
   computing a cost function for a frame of the input video based on a relation between a location of the change and a position of a cropping window for the frame, wherein the cropping window has a second aspect ratio different from the first aspect ratio;
   generating a modified frame corresponding to the frame of the input video based on the cost function and the position of the cropping window for the frame, wherein the modified frame has the second aspect ratio; and
   generating an output video including the modified frame, wherein the output video has the second aspect ratio.

2. The method of claim 1, wherein computing the cost function comprises:
   obtaining metadata for the input video including the location.

3. The method of claim 2, wherein obtaining the metadata comprises:
   initiating, via an image editing interface, a drawing session; and
   receiving a plurality of stroke inputs from a user, wherein the metadata includes location information for each of the plurality of stroke inputs.

4. The method of claim 3, wherein obtaining the metadata further comprises:
   assigning a timestamp to each of the plurality of stroke inputs, wherein the metadata includes the timestamp.

5. The method of claim 3, wherein:
   the metadata comprises a velocity parameter, a pressure parameter, an altitude parameter, an azimuth parameter, or a combination thereof, for at least one of the plurality of stroke inputs.

6. The method of claim 1, wherein:
   the cost function comprises a time-variant function of a state of the cropping window at a time corresponding to the frame of the input video.

7. The method of claim 1, wherein computing the cost function comprises:
   obtaining saliency information for the modified frame, wherein the cost function is based on the saliency information.

8. The method of claim 1, wherein computing the cost function comprises:
computing a transition cost for the modified frame based on a previous frame, wherein the cost function is based on the transition cost.

9. The method of claim 1, wherein generating the modified frame comprises:
computing a regularization term for the frame of the input video based on the cost function, wherein the modified frame is generated based on the regularization term.

10. An apparatus comprising:
at least one processor;
at least one memory including instructions executable by the at least one processor;
an optimization model comprising parameters stored in the at least one memory and configured to compute a cost function for a frame of an input video based on a relation between a location of a change to an image and a position of a cropping window for the frame, wherein the input video has a first aspect ratio and depicts the change to the image, and wherein the cropping window has a second aspect ratio different from the first aspect ratio;
a frame editing component comprising parameters stored in the at least one memory and configured to generate a modified frame corresponding to the frame of the input video based on the cost function and the position of the cropping window for the frame, wherein the modified frame has the second aspect ratio; and
a video generation component comprising parameters stored in the at least one memory and configured to generate an output video including the modified frame, wherein the output video has the second aspect ratio.

11. The apparatus of claim 10, further comprising:
a metadata component configured to obtain metadata for the input video including the location.

12. The apparatus of claim 11, further comprising:
an image editing interface configured to initiate a drawing session and receive a plurality of stroke inputs from a user, wherein the metadata includes location information for each of the plurality of stroke inputs.

13. The apparatus of claim 10, wherein:
the optimization model computes a regularization term for the frame of the input video based on the cost function, wherein the modified frame is generated based on the regularization term.

14. A non-transitory computer readable medium storing code for video processing, the code comprising instructions executable by at least one processor to:
obtain an input video depicting a change to an image, wherein the input video has a first aspect ratio;
compute a cost function for a frame of the input video based on a relation between a location of the change and a position of a cropping window for the frame, wherein the cropping window has a second aspect ratio different from the first aspect ratio;
generate a modified frame corresponding to the frame of the input video based on the cost function and the position of the cropping window for the frame, wherein the modified frame has the second aspect ratio; and
generate an output video including the modified frame, wherein the output video has the second aspect ratio.

15. The non-transitory computer readable medium of claim 14, wherein computing the cost function comprises:
obtaining metadata for the input video including the location.

16. The non-transitory computer readable medium of claim 15, wherein obtaining the metadata comprises:
initiating, via an image editing interface, a drawing session; and
receiving a plurality of stroke inputs from a user, wherein the metadata includes location information for each of the plurality of stroke inputs.

17. The non-transitory computer readable medium of claim 16, wherein obtaining the metadata further comprises:
assigning a timestamp to each of the plurality of stroke inputs, wherein the metadata includes the timestamp.

18. The non-transitory computer readable medium of claim 14, wherein computing the cost function comprises:
obtaining saliency information for the modified frame, wherein the cost function is based on the saliency information.

19. The non-transitory computer readable medium of claim 14, wherein computing the cost function comprises:
compute a transition cost for the modified frame based on a previous frame, wherein the cost function is based on the transition cost.

20. The non-transitory computer readable medium of claim 14, wherein generating the modified frame comprises:
computing a regularization term for the frame of the input video based on the cost function, wherein the modified frame is generated based on the regularization term.

* * * * *